Nov. 9, 1937.  L. A. SAFFORD  2,098,886

EXHAUST PORT PROTECTOR FOR AIR BRAKES

Original Filed Nov. 13, 1935

Inventor
Lewis A. Safford

By
Attorneys

Patented Nov. 9, 1937

2,098,886

UNITED STATES PATENT OFFICE 2,098,886

EXHAUST PORT PROTECTOR FOR AIR BRAKES

Lewis A. Safford, Watertown, N. Y., assignor to The New York Air Brake Company, a corporation of New Jersey Original application November 13, 1935, Serial No. 49,626. Divided and this application October 20, 1936, Serial No. 106,678

3 Claims. (Cl. 303—1)

This invention relates to protectors for exhaust valves for air brakes.

The present application is a division of my copending application Serial No. 49,626, filed November 13, 1935, and is directed specifically to a modified form of the invention which was disclosed in said application.

The problem of preventing mud daubers, certain species of bees, and wasps, from building nests in the exhaust ports of air brakes has become quite familiar in the art, there having been a marked increase in this difficulty in recent years, either because of an increase in the number of such insects or because of a more favorable formation of the exhaust ports in modern retainer valves and automatic brake valves to the purposes of the insects.

While the protectors are primarily intended for use to protect the exhaust ports of retainer valves they are available for use in protecting exhaust ports generally, and in some cases it is vital that they offer little or no resistance to flow. Any construction which houses the exhaust port and produces a darkened cavity, particularly a relatively small cavity, seems to increase the attractiveness as a nest. For this reason constructions in which the wasp excluder or protector is fully exposed to light seemed to give the best results. This exposure, however, favors the formation of ice and sleet with the result that the exhaust ports are occasionally closed in this way. In other words, prior solutions of the problem have introduced new difficulties.

The present invention provides a type of excluder which is not only effective to exclude the wasp, but which would be self-clearing in the event that the wasp does build a nest on the excluder or in the event that the excluder is coated with ice.

It has already been proposed to construct the exhaust protector as a sort of outward opening check valve. One patented type shows a disk valve which is bodily movable and another shows a butterfly valve which is hinged at one side. Valves of this type are relatively expensive to manufacture. They do not produce a good closure unless an unduly heavy spring is used. They are subject to considerable wear under vibration, and worst of all, when sealed by adherent mud or ice, they cannot open except by rupturing the sealing bond simultaneously throughout the entire sealed area.

According to the present invention use is made of a valve having a seat and an outwardly opening valve member. The valve member is made of flexible resilient material, preferably rubber, and the seat member is constructed of relatively rigid material, and conveniently as an extension of the threaded nipple or mount used to attach the protector to the exhaust port of the protected valve.

The form of the flexible resilient valve is such that when the valve is subject to pressure of discharge it will be deformed progressively as the pressure rises. The effect of this is to crack or break away the adherent solids because of the flexible character of the valve which can open with a sort of tearing motion so that rupture of the sealing bond will start at the weakest point and continue progressively until the valve opens completely. Because of this action a flexible valve will open under pressure which will not open a rigid hinged valve.

The invention will now be described with reference to the accompanying drawing, in which,—

Figure 1:
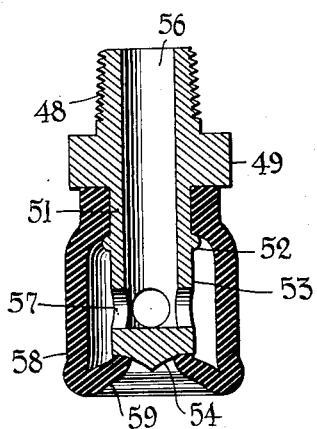
Fig. 1 is an axial section through the protector.
Figure 2:
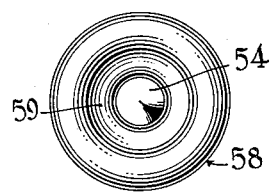
Fig. 2 is an end view thereof.

In the embodiment illustrated, 48 is a threaded nipple with wrench grip 49, seat 51, bead 52 and extension 53 terminating in a conoidal valve seat 54. Passage 56 leads through the nipple to lateral ports 57 in extension 53. Mounted on seat 51 is a valve element having a cylindrical portion 58 at the outer margin of which is a reentrant flange 59 which normally engages the conoidal seat 54.

If the flange 59 be sealed to the seat inflation and distortion of the portion 58 assist in breaking the seal.

The rubber valve member 58 may be vulcanized or cemented to the seat 51, or other known means of attachment may be adopted.

The protector above described is suited for use on retainer valves to control the main exhaust port. If a retainer valve is not used the protector may be mounted directly on the exhaust passage of the triple valve itself.

The embodiment above described has desirable operative characteristics because the form of the rubber valve favors marked deformation of this element when subjected internally to pressure.

What is claimed is,—

1. A protector for the exhaust ports of air brakes, comprising in combination, a central valve seat, and a coacting hollow valve member, subject internally, at least when the valve is closed, to the pressure of discharging pressure fluid, and having an inwardly extending flange which normally enters into engagement with said valve seat to effect closure of the valve, said valve member inclusive of said flange, being of resilient deformable material.

2. A protector for the exhaust ports of air brakes, comprising in combination, a central valve seat, and a coacting hollow valve member, subject internally, at least when the valve is closed, to the pressure of discharging pressure fluid, and having an inwardly extending reentrant flange which normally enters into engagement with said valve seat to effect closure of the valve, said valve member inclusive of said flange, being of resilient deformable material.

3. A protector for the exhaust ports of air brakes, comprising in combination, a central valve seat, and a coacting hollow valve member, subject internally, at least when the valve is closed, to the pressure of discharging pressure fluid, and having an inwardly extending flange which normally enters into engagement with said valve seat to effect closure of the valve, at least said flange being composed of resilient deformable material.

LEWIS A. SAFFORD.